(No Model.)
T. F. MOSS.
HOSE COUPLING.
No. 360,779. Patented Apr. 5, 1887.
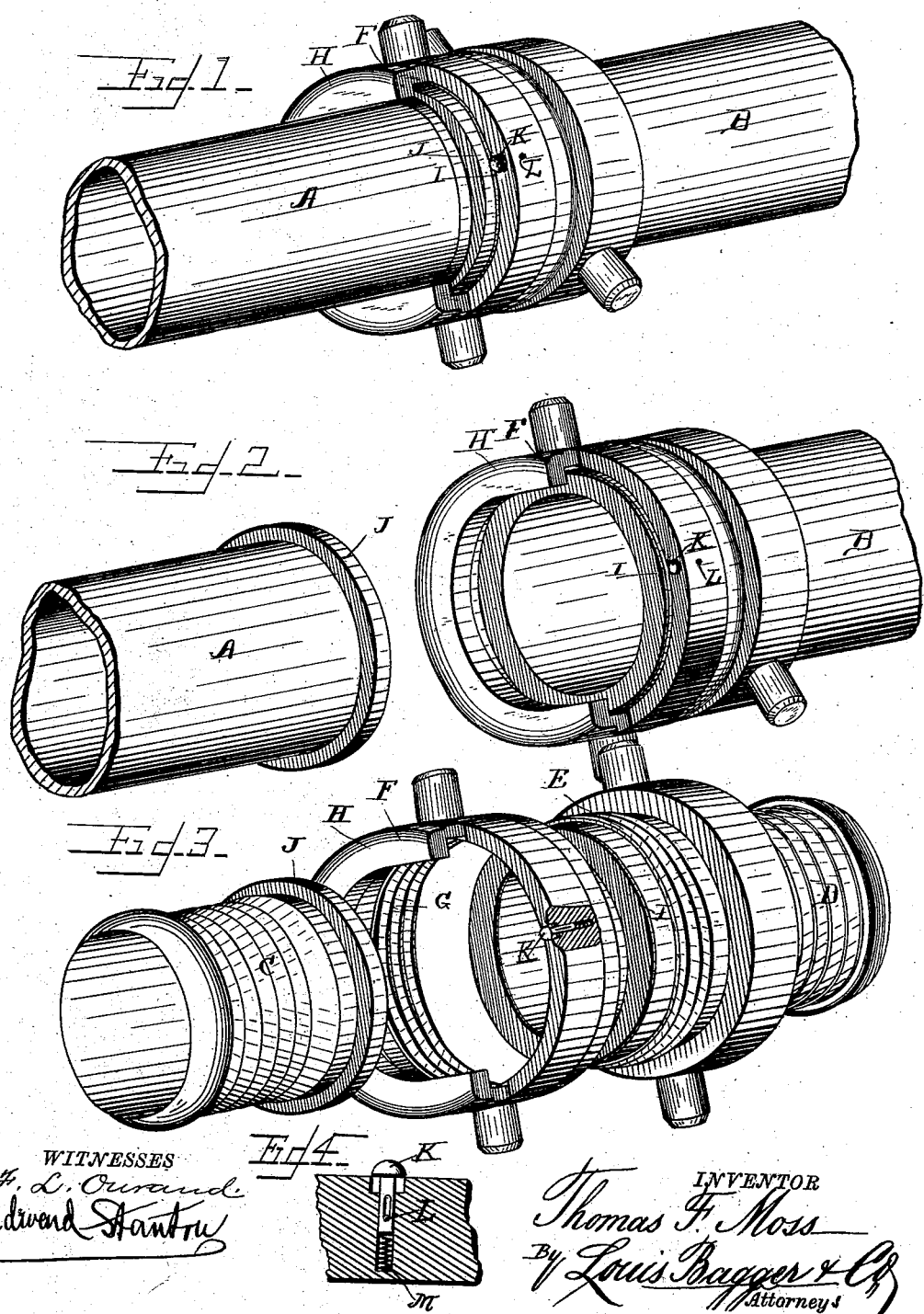

UNITED STATES PATENT OFFICE.

THOMAS F. MOSS, OF HUDSON, WISCONSIN.

HOSE-COUPLING.

SPECIFICATION forming part of Letters Patent No. 360,779, dated April 5, 1887.

Application filed May 26, 1886. Serial No. 203,299. (No model.)

*To all whom it may concern:*

Be it known that I, THOMAS F. MOSS, a citizen of the United States, and a resident of Hudson, in the county of St. Croix and State of Wisconsin, have invented certain new and useful Improvements in Hose-Couplings; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view showing my improved hose-coupling. Fig. 2 is a view showing the coupling separated. Fig. 3 is a perspective view showing the three portions forming the coupling, and Fig. 4 is a detailed view in section showing the automatic stop.

Similar letters of reference indicate corresponding parts in all the figures.

My invention has relation to hose-couplings; and it consists in the improved construction and combination of parts of a coupling in which the sleeve at the end of one length of hose may be slipped into the collar turning upon the screw-threaded end of the sleeve upon the opposite length of hose from the side and be drawn toward the threaded end of the sleeve by the collar, as hereinafter more fully described and claimed.

In the hose-coupling generally used the end of one length of hose has been provided with a sleeve having an outwardly-projecting annular flange at its outer end, and having a collar having an interior screw-thread and an inwardly-projecting flange at its inner end turning upon the flanged end of the sleeve, and this female threaded collar is adapted to be screwed upon the screw-threaded outer end of a sleeve in the opposite length of hose; but in this coupling there has been several drawbacks, such as the delay caused by fitting the collar upon the screw-threaded end of the opposite sleeve and the possibility of cutting the threads of the sleeve or of the collar by crossing the threads, or the stoppage caused by the thread of the sleeve or collar becoming clogged by dirt or by ice; and my invention is for the purpose of avoiding these drawbacks and producing a hose-coupling which may be coupled in a moment of time, and in which there is no fitting of threaded parts or any possibility of threaded parts being clogged, as I shall now proceed to describe.

In the accompanying drawings, the letter A indicates the end of one length of hose, and B indicates the other length of hose, and the sleeves C and D are secured into the ends of these lengths of hose in the usual manner, the sleeves having preferably threads or ribs upon their outer sides, which will bite in the inner side of the hose.

The outer end, E, of one of the sleeves is screw-threaded, and a collar, F, having an interior screw-thread, G, fits upon it, and the outer edge of this collar is formed with an inwardly-bent flange, H. A portion slightly less than one half of the outer edge and of the flange of the collar is cut away, and the outer end of the sleeve is provided with a packing ring or gasket, I, secured to the end by any suitable means.

The other sleeve is formed with an outwardly-projecting annular flange, J, at its outer end, and the end of the sleeve and the flange may slip through the aperture in the outer edge of the collar and its flange, the outwardly-projecting flange fitting against the inner side of the inwardly-projecting flange of the collar and being retained by the same. After the flanged sleeve has been slid into the collar the collar may be revolved upon the threaded end of the other sleeve, tightening the flanged end of the sleeve against the gasket, and in this manner a tight joint may be formed, which at the same time will allow the two sections of hose to revolve relatively to each other, the flanged end of the sleeve revolving within the flanged end of the collar.

It will be seen that the collar needs only to be slightly loosened to allow the flanged end of the sleeve to be slid either in or out through the aperture in the collar, and that the said flanged end may slide with ease into or out of the aperture, so that the coupling may be accomplished in a moment of time, the turning of the collar only occupying a very short space of time, as it is only necessary to revolve it possibly a portion of a revolution, or possibly one revolution, depending upon the steepness of the threads of the collar and of the sleeve.

The sleeves in the ends of the lengths of hose may be of any suitable construction, and the sleeve having the threaded end may either be provided with an integral collar or flange provided with means for holding a wrench, as shown in the drawings, or the said collar may be dispensed with.

The collar turning upon the screw-threaded end of the sleeve may also be provided with ears or projections for engagement with a wrench, as shown in the drawings; or the collar may be provided with any suitable means for affording suitable hold in turning the same.

An automatic stop consisting of a semispherical headed pin, K, having a slot in its shank, is secured in a counterbored socket in the middle of the face of that portion of the collar from which the flange is cut by means of a pin, L, passed through the collar and the slot in said stop, the stop being rendered automatically adjustable by placing a spiral spring, M, in the socket under the pin. This construction will prevent the collar from being lost during transportation or from otherwise working itself off from the flanged sleeve. It will also prevent said sleeve from dropping from the collar at the time of turning the latter up in making a coupling.

Having thus described my invention, I claim and desire to secure by Letters Patent of the United States—

The combination of the sleeves C D and flanged collar F, having a portion of said flange cut away, and the automatic stop located in a socket in the face of that portion of the collar from which the flange is cut away, said stop consisting of a semispherical headed pin, K, provided with a slot in its shank, a pin, L, and a spiral spring, M, substantially as shown and described.

In testimony that I claim the foregoing as my own I have hereunto affixed my signature in presence of two witnesses.

THOMAS F. MOSS.

Witnesses:
ALBERT FARRAS,
WILLIAM MAIER.